Aug. 5, 1958 W. FEW ET AL 2,846,642
MAGNETIC AMPLIFIER CONTROL SYSTEMS
Original Filed July 28, 1952
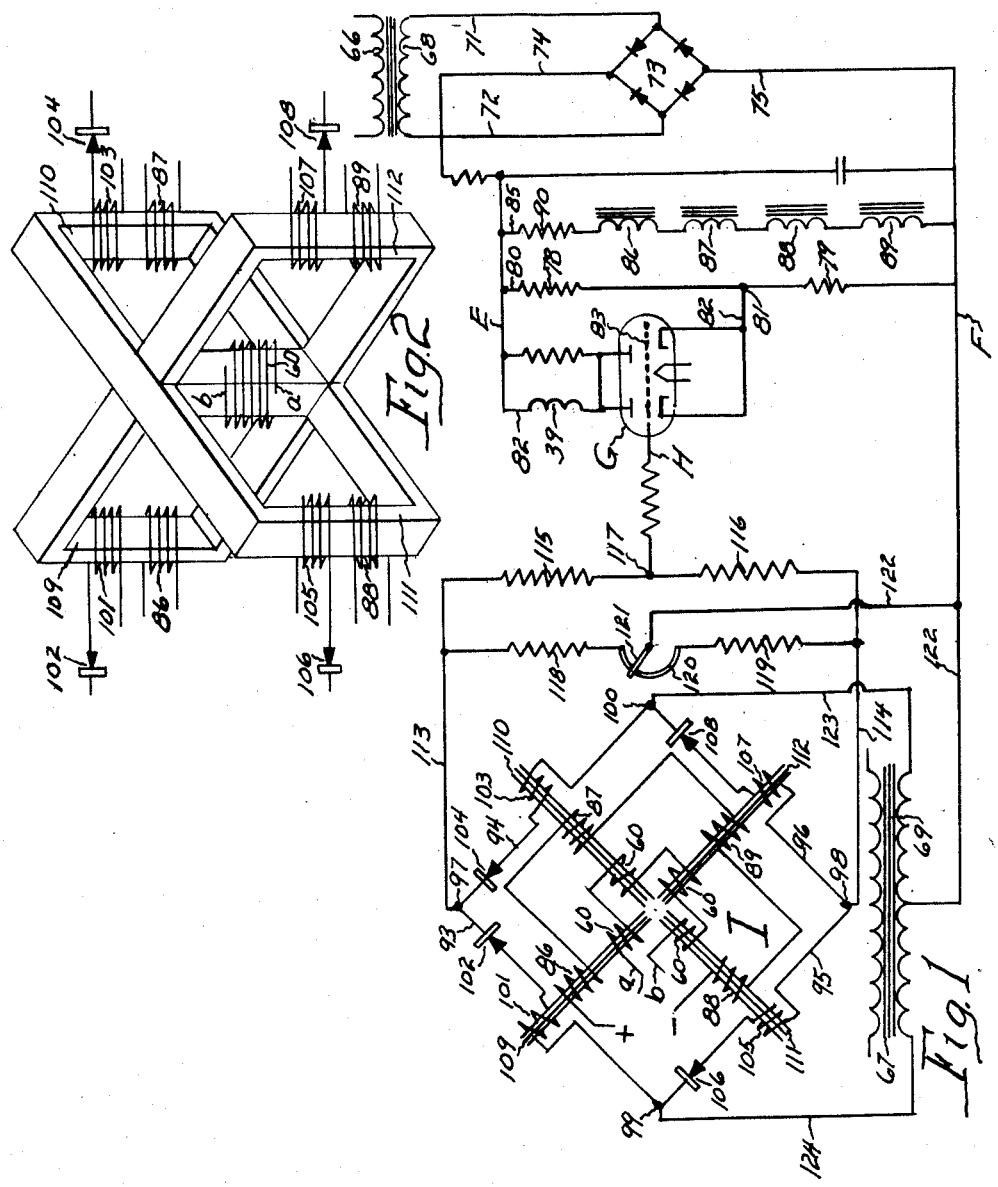
INVENTORS
William Few
and
John D. Sauter
by Harry P. Canfield
Attorney

United States Patent Office 2,846,642
Patented Aug. 5, 1958

2,846,642

MAGNETIC AMPLIFIER CONTROL SYSTEMS

William Few, Goshen, Ind., and John D. Sauter, Lyndhurst, Ohio, assignors to The Clark Controller Company, Cleveland, Ohio, a corporation of Ohio Original application July 28, 1952, Serial No. 301,292, now Patent No. 2,744,230, dated May 1, 1956. Divided and this application October 20, 1955, Serial No. 541,721

2 Claims. (Cl. 323—89)

This invention relates to electric control systems of the class in which variations of an electric current that correspond with variations of some condition or quantity are converted into variations of potential by a saturable magnetic amplifier and the variations of potential are utilized to effect variable energization of a device that controls the operation of an apparatus.

In pending patent application Serial No. 301,292, filed July 28, 1952, now Patent No. 2,744,230, for Automatic Current Regulating Apparatus, is described a system in which variations in the ratio of two quantities (the outputs of two electric generators) produce current of varying value in a winding 60; and the winding 60 is utilized as the saturating winding of a magnetic amplifier I of the rectifying transductor type; and the transductor delivers varying amplified potential that is utilized to effect variable energization of a winding 39 that controls a regulating means to regulate the said ratio to a desired value.

The invention of the present application is divisional from said pending application and is embodied in that part of the system of the pending application that includes the windings 60 and 39 and the parts therebetween, independently of the character of the means for energizing the winding 60 and of the character of the regulating means controlled by the winding 39.

The objects of the invention are to provide:

A transductor having an improved arrangement of parts and circuits.

A transductor having a control winding, and responding to variations of current in the winding, to deliver variable output potential in an improved manner.

A control system comprising a transductor and a control winding therefor, for causing the transductor to deliver variable potential to a pair of control mains in response to variations of current in the control winding, in an improved manner.

The invention is fully disclosed in the following description taken in connection with the accompanying drawing in which:

Fig. 1 is a diagrammatic view illustrating an embodiment of the invention; and,

Fig. 2 is a three dimensional view of a device shown diagrammatically in Fig. 1.

Referring to the drawing Fig. 1, at 66 is a transformer primary which may be energized from 60 cycle supply mains not shown, and at 68 is the transformer secondary.

The secondary 68 supplies alternating current by wires 71—72 to a polygonal loop rectifier 73, which delivers direct current by wires 74—75 to two control mains E and F poled to be positive and negative respectively, a suitable potential across the mains E—F being, as an illustrative example 120 volts.

A pair of resistors 78—79 are in a line 80 between the control mains, constituting in effect a voltage divider and providing a point 81 of slightly higher potential than the main F; determined by a large value of the resistor 78 relative to a small value of the resistor 79, which may be in the ratio, respectively, of 80 to 1, whereby the voltage at the point 81 may in the illustrative case be 1.5 volts.

A three element control tube G has its main electrodes in a line 82—82 between the control main E and the point 81. The aforesaid winding 39 is in the line 82.

The value of current in the winding 39 is, at all times, determined by the energization of the grid 83 of the tube G in a manner to be described.

In a line 85 across the control mains E—F is a series of four flux biasing windings 86, 87, 88 and 89 to be referred to, all alike and equally energized by voltage of the mains E—F, the degree of energization determined by a resistor 90 in the line 85.

As to energization of the grid 83 of tube G, the grid is connected to a line indicated generally at H, and the cathode of the tube is connected to the point 81, and thence to the main F, and energization of the grid will therefore vary responsive to variations of the potential across the mains H—F.

In a manner now to be described, the potential between the mains H—F will vary in response to changes of energization of a control winding 60.

At I is a diagrammatic showing of a saturable reactor of the transductor class, comprising a rectangular loop circuit having four legs 93—94—95 and 96, and rectangular corners 97, 98, 99 and 100.

In each leg is an inductor winding and a dry plate rectifier, that is: in the leg 93, a winding 101 and rectifier 102; in the leg 94, a winding 103 and rectifier 104; in the leg 95, a winding 105 and rectifier 106; and in the leg 96, a winding 107 and a rectifier 108.

The rectifiers are conductive in the directions indicated by arrows in the conventional symbolic illustrations of such rectifiers.

Associated with the inductor windings 101, 103, 105 and 107, are respectively, the aforesaid flux biasing direct current windings 86, 87, 88 and 89 shown without connections, but shown connected in the line 85 between mains E and F as already described, and energized with unidirectional current.

The aforesaid control winding 60 is shown at the transductor I, and is associated with all of the other windings, and to render this apparent in the diagrammatic showing, it is illustrated as in four parts 60—60—60—60.

Cores are shown diagrammatically at 109—110—111—112 one for each set of windings, for example a core 109 for the windings 60, 86 and 101.

A perspective view, of a mechanical arrangement for the windings and cores is shown in Fig. 2. Here the cores 109—110—111—112 on which the inductor windings and flux biasing windings are wound, are complete rectangular cores. The arrangement corresponds in all respects to the diagrammatic showing of Fig. 1, except that the control winding 60 is shown wound around a leg of each core and is therefore common to all of the cores.

The flux biasing windings 86—87—88—89 are poled to be in opposition to their respectively associated inductor windings 101, 103, 105, 107; and thus bias the flux in the inductor windings to increase their normal inductance and cause a small value of current to flow therein.

When current flows in the winding 60 it is unidirectional; and it will be observed, with reference to Fig. 2, that if the flux produced by it, flows say upwardly, it will oppose the flux in inductor winding 103 and augment the flux in inductor winding 105; and oppose the flux in winding 101 and augment that in winding 107; and conversely if it is energized in the other directions.

Mains 113—114 in Fig. 1 are connected to the corners 97—98.

Across the mains 113—114 are two resistors 115—116 of equal value, in series, the aforesaid main H being connected to a point 117 between them.

Across the mains 113—114 are also connected in series two equal resistors 118—119 and a potentiometer resistor 120 between them, the latter having a movable contact arm 121 which may be considered as a point 121, connected by a wire 122 to the mid-point of a secondary 69 to be described, and to the aforesaid main F.

A transformer 67 has a primary energized from 60 cycle supply mains not shown and has a secondary 69. The ends of the secondary are connected to the corners 100—99 of the rectangular loop, by wires 123 and 124.

As will appear, the potential impressed on the mains 113—114 is unidirectional, the transductor I among other functions, performing full wave rectification of the current supplied by the transformer secondary 69. A description for one half wave as to its impressing a voltage on the mains 113—114 will be given herein, and it will be understood that a description for the other half wave would be the same.

It will be assumed, under the conditions obtaining at this time, that the winding 60 is not energized; and that the contact arm 121 is at the middle of the resistor 120.

When current flows toward the right in secondary 69, the potential of the right half of secondary 69 is impressed on a circuit comprising the wire 123, point 100, inductor winding 103, rectifier 104, point 97, main 113, resistor 118, part of resistor 120, point 121, wire 122 to the mid point of the secondary 69; and the potential of the left half of secondary 69 is impressed on a circuit comprising, wire 122, point 121, part of resistor 120, resistor 119, wire 114, point 98, inductor winding 105, rectifier 106, point 99 and wire 124.

Half waves of alternating current thus flow from the secondary 69 through the resistor 118 and part of 120, and through the resistor 119 and part of 120, and due to the inductance of the windings 103 and 105 increased by the opposing biasing windings 87 and 88 is kept down to a small value.

The said currents produce two equal drops of potential in the resistors 118—120 and 119—120 respectively, assuming that the arm of point 121 is at the middle of the resistor 120.

The drops of potential produce a predetermined potential between mains 113—114.

The control main F is connected by wire 122 to the arm 121 at the middle of the drop between mains 113—114.

The aforesaid resistors 115 and 116 being also connected across the mains 113—114, and being equal, the drop between the mains divides equally between them at all times, and the middle or halfway point of the drop is at the point 117 to which the main H is connected.

It will thus be seen, that under the assumed conditions, the mains H and F will be at the same potential.

Due to inaccuracies of value of the resistors 118 and 119, and to errors of manufacture and assembly of the parts and other incidental discrepancies, when the arm 121 is at the mid-position, on the resistor 120, the said two drops of potential may not be equal and the potential of the mains H and F may not be equal; but it is believed to be apparent that they may be made equal by adjusting movement of the arm 121 in one direction or the other, and this equalizing position of the arm 121 is taken as its zero setting on a dial thereof not shown.

As to the effect of the winding 60, it may be considered as energized by unidirectional current flowing in at $a$ and out at $b$, or in at $b$ and out at $a$; and of variable value in either case; in response to variations of some condition or quantity occurring in an apparatus, one example of which is that described in said parent application Serial Number 301,292.

In Fig. 1, current flowing in at $b$ and out at $a$ will oppose the flux in inductor winding 105 and augment that in winding 103, with the result that more current will flow through winding 103 and through resistor 118, and less current through winding 105 and resistor 119; thus increasing and decreasing respectively the potential drops in these resistors and lowering the potential at the point 121 and at the main F, without changing the potential across mains 113—114 and therefore without changing the potential of main H.

If current flows in the reverse direction in the winding 60, it will, conversely, raise the potential of main F relative to that of main H.

With no current in the winding 60, the mains H and F will be at the same potential, as described.

The grid 83 of tube G is connected to the main H and the cathode of the tube is connected to the point 81. When the mains H and F are at the same potential, current may be considered as flowing from main H through the grid-cathode circuit due to the potential at the point 81, rendering the grid positive with respect to the cathode and the tube will pass current through the winding 39 of an amount predetermined by the potential of the point 81.

When change of current in the winding 60 changes the potential of main F with respect to that of main H as described, the energization of the grid cathode circuit of the tube will accordingly change and increase or decrease energization of the winding 39.

The winding 39 may then energize any desired device whose energization is wanted to respond to variation of the current in the winding 60; an illustrative example of which is described in said parent application, Serial Number 301,292.

The transductor I, is an amplifier; and by means of its construction and arrangement of parts and circuits may deliver output potential that is an amplification of the control potential, on the winding 60, of the order of several thousand-to-one, whereby variable energization of the winding 39 will respond sensitively to minute changes of current in the winding 60.

For example, with the mains H—F at equal potential due to no current in the winding 60, then upon the occurrence of current in the winding 60 caused by impressing 1 millivolt thereon, may by said amplification of the transductor I, produce a difference of 2 or 3 volts between the mains H and F.

The novelty of the transductor I which provides this sensitive amplification resides in the provision of four transductor elements each comprising a core, an A. C. inductor winding, a rectifier, and a D. C. flux biasing winding; the transductor elements arranged to provide two full-wave transductors; energized by one transformer secondary and having two output mains; and the level of flux in all of the cores being subject to the current in a single D. C. saturating winding; and a voltage divider across the output mains having an adjustable point, connected to the mid point of the secondary.

The output of the transductor to the mains H and F will in general have ripples or fluctuations in it as will be understood, and in some cases it may be desirable to utilize a filter to iron out these fluctuations; and such a filter, applicable to the system of Fig. 1, is shown in pending application Serial Number 301,292 and also constitutes the subject matter of a pending divisional application Serial Number 535,490.

Subject matter illustrated and described herein but not claimed is being claimed in said applications Serial No. 301,292, filed July 28, 1952, and Serial No. 535,490, filed September 20, 1955.

I claim:

1. A transductor system comprising: four linear circuit elements, each comprising an inductor winding and a rectifier in series; a core in each winding; the circuit elements connected together end to end at four connection points in a closed loop formation, two opposite points being connected to spaced points of an A. C. transformer secondary, the other two opposite points connected to out-put terminals; the rectifiers poled so that a first pair of elements are conductive from one terminal connected point to the two opposite A. C. connected points; and so that the second pair of elements are conductive from the two opposite A. C. connected points to the other terminal connected point; a control winding common to all of the cores having terminals for connecting it to be energized by variable control current from a unidirectional source; the control winding and inductor windings poled so that the control winding energization increases the core flux of one pair of elements and decreases the core flux of the other pair of elements; a voltage divider between the output terminals; a connection from an intermediate point on the voltage divider to the mid-point of the secondary, and to a main of a circuit to be controlled; a second voltage divider between the output terminals and a connection from an intermediate point of the second divider to another main of the circuit to be controlled.

2. A control system comprising a magnetic amplifier having a plurality of like main windings each with a rectifier in series therewith, and energized across the main terminals of a transformer secondary, and supplying unidirectional potential to a pair of output terminals; a control winding common to all of the main windings and having terminals for connecting it to be energized by variable current from a unidirectional current source; the polarity of the main windings with respect to that of the control winding being predetermined so that the control winding assists a number of the main windings and opposes a like number to cause the potential across the output terminals to be substantially constant at different values of variable control winding current; a first pair and second pair of equal resistors connected across the output terminals; a point between the first pair of resistors connected to a first control main; a point between the second pair of resistors connected to a second control main and also connected to an intermediate point of the transformer secondary; and a work circuit to be controlled connected across the mains.

References Cited in the file of this patent
UNITED STATES PATENTS

| | | |
|---|---|---|
| 2,403,891 | Lamm | July 9, 1946 |
| 2,704,823 | Storm | Mar. 22, 1955 |
| 2,752,549 | Alexanderson | June 26, 1956 |